Aug. 9, 1966  HANNS-DIETER PASCHKE  3,265,046
ROTARY INTERNAL COMBUSTION ENGINE
Filed June 8, 1964  2 Sheets-Sheet 2

INVENTOR.
HANNS-DIETER PASCHKE
BY Raymond P. Wallace
AGENT

United States Patent Office 3,265,046
Patented August 9, 1966

3,265,046
ROTARY INTERNAL COMBUSTION ENGINE
Hanns-Dieter Paschke, Neckarsulm, Wurttemberg, Germany, assignor to NSU Motorenwerke Aktiengesellschaft, Neckarsulm, Germany and Wankel G.m.b.H., Lindau, Germany
Filed June 8, 1964, Ser. No. 373,254
Claims priority, application Germany, June 26, 1963, N 23,368
6 Claims. (Cl. 123—8)

This invention relates to rotary internal combustion engines, and more particularly to rotary-piston engines of the Wankel type, generally similar to that disclosed in U.S. Patent No. 2,988,065.

Such a rotary combustion engine comprises an outer body having a cavity therein and an inner body disposed within the cavity, the inner body being rotatable relatively to the outer body about an axis spaced from but parallel to the axis of the cavity. The outer body has axially spaced end walls and a peripheral wall interconnecting the end walls to form the cavity, the inner surface of the peripheral wall having a multi-lobed profile which preferably is basically an epitrochoid. The inner body has end faces disposed adjacent to the outer body end walls for sealing cooperation therewith, and has a peripheral surface with a profile having a plurality of circumferentially-spaced apex portions, each such apex portion bearing a radially movable seal element for sealing engagement with the inner surface of the peripheral wall to form a plurality of working chambers which vary in volume on relative rotation of the two bodies. Each such apex seal extends in an axial direction from one end face to the other of the inner body. The number of apexes will usually exceed the number of lobes of the epitrochoid by one.

In the following discussion the inner body will be referred to for convenience as the rotor and the outer body as the housing. It will be understood, however, that the present invention is equally applicable to mechanisms wherein the housing is rotary and the inner body stationary, or wherein both parts may be rotatable, as described in Patent No. 2,988,065.

For the purpose of introducing explosive charge and exhausting burned gases, there are provided in the housing gas inflow and outflow channels, the ports of which are overridden by the rotor. Internal combustion engines of this type have the advantage that they can be provided with intake ports of relatively large cross-section, which produces high volumetric efficiency and correspondingly high performance. However, when a large intake port is provided it is not possible to avoid some overlapping of induction and exhaust. Therefore, during idling and starting, as well as when operating under only a small load, the large cross-section of the intake channel has a disadvantage, because in this operating range the necessarily small amounts of fuel-air mixture may become unmixed in the intake channel, and a portion of the fuel may condense on the walls. Owing to this condition, the mixture entering the working chamber is not of constant composition.

Further, with such engines there is a relatively large overlap of intake and exhaust within a given chamber, which at low load and with diminished throttle may cause some entry of exhaust gases into the intake channel because of the low pressure existing therein. Thus the incoming mixture for idling or low load becomes contaminated with exhaust gases, impairing its ignitibility and resulting in uneven operation. This effect is of no consequence at higher load operation, since the higher pressure in the intake channel largely inhibits transfer of exhaust gas to the induction chamber, and the percentage of contamination is much lower.

Various inventions have been proposed having the purpose of avoiding this drawback. Engines with reciprocating pistons have been provided with separate carburetor arrangements for idling and for operating under load, communicating with a common chamber intake provided with a valve for switching from one carburetor to the other. Providing such a special valve for a port-controlled engine such as the present would increase its cost, and would bring no advantage, since the intrusion of exhaust gases into the suction chamber, and the unmixing or partial condensation of fresh gas in the single induction channel, would not be prevented.

It is also known to provide port-controlled engines of this type with separate idling induction channels opening directly into favorably located places in the defining walls of the induction chamber, such locations being overrun by the piston but periodically exposed to an expanding chamber. By this arrangement it is possible to adapt the intake cross-section to the requirement for idling, but ignitibility of the inducted mixture is still not insured, since the exhaust gases due to overlap are still present.

It is further known to interrupt ignition periodically so that a chamber does not fire on every compression cycle. This is accomplished by a separate low-speed ignition system which becomes operative at a given transmission ratio relative to the crankshaft, in accordance with throttle setting, the main ignition system being cut out at the same time. The repeated filling and scavenging of the chamber with fresh gas provides a mixture that can be ignited reliably, but there is a considerable unavoidable throughput of unburned gases.

In accordance with the present invention there is provided a simple and reliable arrangement in which during idling, and in the lower portion of partial-load operation, less than all the normal working chambers are provided with fuel. This is accomplished by providing in at least one end wall of the housing a relatively small intake opening disposed in a location which is continuously covered by the rotor end face, the rotary piston having in the adjacent end face at least one recess cut to the edge of the working face, this recess mating with the intake opening once in each rotor revolution, thereby bringing the intake opening briefly into communication with the working chamber during its induction phase.

The supply of fuel-air mixture to the auxiliary intake opening is provided through a separate inflow channel from the idling system of the main carburetor, or alternatively from a separate idling carburetor the control of which is linked to the throttle setting of the main carburetor. If the separate idling carburetor is provided with a separate fuel tank it becomes possible, independently of the composition of the mixture delivered through the main carburetor from the main tank, to operate during idling with either pure fuel, or with a heavy admixture of lubricating oil.

Such an arrangement according to the invention avoids the condition wherein the small quantity of fresh gas required for idling at a given speed, or for operating in the lower region of partial load, would be distributed equally among all the working chambers, whereby the volume of fresh gas in any given chamber would be small and no longer reliably ignitible. Therefore, when the engine is idling or operating in the lower region of partial load, the required amount of fresh gas is distributed to less than all the working chambers, and preferably to only a single chamber, the result being that the chamber being fed receives a correspondingly greater proportion of its volume in fresh gas. The influence of exhaust gas transferred to the induction chamber through the overlap of exhaust and induction decreases as the proportion of fresh gas increases; also, since the other chambers have not fired, having had no fuel, they have less exhaust to transfer. Thus the system of the invention insures reliability of ignition even at very low idling speeds.

The use of such a separate intake channel is not limited to idling and low-load conditions. It is also possible to supply through it the necessary quantity of lubricant for lubricating the sliding and sealing surfaces throughout the entire operating range of the engine. Since not all working chambers are supplied by the separate channel, it makes possible more precise metering of the extremely small amount of oil required by supplying the separate intake channel from a separate tank having a fuel-oil mixture. The oil fraction of the fuel-air intake gas deposits on the interior surfaces of the housing and is swept around by the sliding members, assuring lubrication for all chambers.

The supply of fuel-air mixture or fuel-air-oil mixture may be accomplished by various carburetor arrangements. For example, the main carburetor is preferably supplied with pure fuel and communicates only with the main induction port, and a second carburetor in communication only with the idling intake channel is supplied with a fuel-lubricant mixture and is controlled by cams or linkage or the like, depending on the setting of the main carburetor. The regulation is prefereably so arranged that the second carburetor, in the closed-throttle position of the main carburetor, supplies sufficient fuel-air-oil mixture for idling and for low-load operation. With opening of the main throttle the supply of mixture from the second carburetor is decreased, and may then subsequently increase approximately proportionally to the main throttle opening, for the purpose of supplying lubricant depending on the load.

It is further possible to have a separate, third carburetor communicating with the idling intake channel. The third carburetor is, like the main carburetor, supplied from the main tank filled with pure fuel. This third carburetor is also controlled in accordance with the main throttle setting, and becomes functional when the main throttle is nearly closed, the third carburetor thus serving for idling and low-load operation, while the second carburetor connected to the fuel-oil tank is proportionately functional throughout the entire engine operating range. Other groupings and linkages of carburetors are possible to supply lubrication in various proportions at any part of the operating range.

The invention may also be applied to fuel-injection engines by running the injection pumps at a lower speed proportional to engine speed during idling, or by phasing out injection into part of the working chambers.

The invention will be readily understood on reading the following specification in connection with the accompanying drawings, in which FIG. 1 is a cross-section transverse to the axis of a rotary piston engine;

Figure 1:
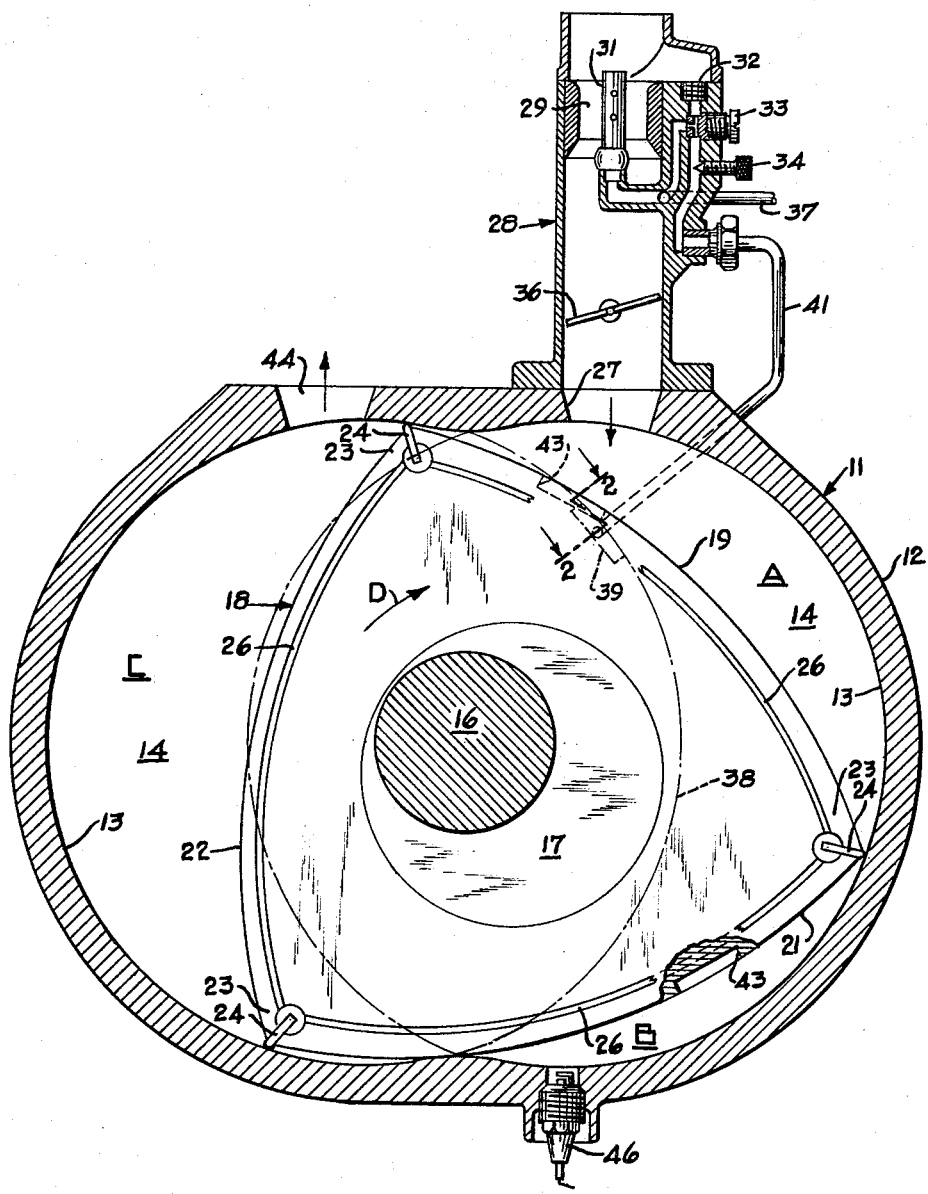

Referring more particularly to FIG. 1, there is shown an axial cross-section of a rotary piston engine of the epitrochoidal type, designated generally by the numeral 11, having a housing comprising a peripheral wall 12 with an inner surface 13 of basically epitrochoidal profile, and a pair of axially-spaced end walls 14, of which only the rearmost is shown. The peripheral wall and end walls define a multi-lobed cavity through which passes coaxial therewith a shaft 16 having an eccentric portion 17 disposed within the cavity. A multi-apexed rotor 18, having one more apex than number of lobes of the cavity, is rotatably mounted on the eccentric. As shown here the rotor is generally triangular in outline, although it will be understood that such outline will vary depending on the number of apexes. The rotor has a working face extending between each pair of adjacent apexes, the three working faces shown being designated by the numerals 19, 21, and 22. As the rotor rotates about the eccentric, which in turn planetates about the axis of shaft 16, there are formed variable-volume working chambers A, B, and C between the rotor and the peripheral wall, the chambers being defined by the housing and the working faces of the rotor.

Each apex portion 23 of the rotor is provided with a radially-movable seal 24 which slides continuously along the inner peripheral surface 13 as the rotor turns. The direction of rotation of the rotor is indicated by arrow D. The end faces of the rotor are provided with axially-movable end-face seals 26 extending between apex portions and generally parallel to the working faces of the rotor. The apex seals and the end-face seals in combination prevent leakage of gases from the working chambers as they are formed and move around with the rotor.

The peripheral wall is provided with a relatively large aperture comprising an intake control-port 27 with which communicates a carburetor 28. The carburetor has in the usual way an air passage 29, a main fuel nozzle 31 disposed therein, an idling air passage 32, an idling nozzle 33, an idling mixture-regulating screw 34, and a throttle valve 36 disposed in the main mixture passage below the main fuel nozzle. Fuel is supplied from a tank (not shown) through conduit 37 to the carburetor, the passage dividing therein to supply main nozzle 31 and idling nozzle 33.

The fuel-air mixture for normal operation is sucked through port 27 from the carburetor, the quantity being regulated by throttle valve 36. For idling a special idling port is provided in one or both end walls of the housing. During the planetation of the piston within the housing, there is an area of each end wall which is continuously covered by the adjacent end face of the piston; this area is shown in FIG. 1 enclosed within the delimiting curve 38. Within this occluded area and near the delimiting curve one or both end walls is provided with a relatively small idling port 39 communicating with the idling system of the carburetor by conduit 41, the idling port 39 being located in that portion of the occluded area which is adjacent to the induction chamber A. The idling port may be of any desired shape, but it is convenient to make it generally rectangular in outline, as shown, and of sufficient size that it will have a brief, but not instantaneous, period of communication with the induction chamber as the rotor turns.

Communication of the idling port with the induction chamber is established by providing the piston with at least one mating recess 43 in at least one end face, recess 43 being open to the adjacent working face of the piston. Preferably only one piston recess 43 is provided, but there may be a plurality, as in FIG. 1 wherein one such piston recess is shown opening to working face 19 and another recess opening to working face 21. Recess 43 is located at the edge of the end face of the piston, radially outward of the end seal; it may be of any desired outline, but is preferably generally congruent with the outline of the idling port 39. Recess 43 is so disposed in the rotor end face that it does not mate with the idling port until the trailing apex portion of the adjacent working face has passed the exhaust port 44 in the peripheral wall.

As shown in FIG. 1, the rotor is in such a position that the exhaust port is closed to chamber A which is in the induction portion of the cycle, and in a few more degrees of rotation recess 43 will mate with idling port 39 and a supply of the idling mixture will be drawn into chamber A. Chamber B is nearing full compression and is very nearly in position where spark plug 46 will deliver an ignition spark. Chamber C is open to the exhaust port, but since the main throttle is closed and chamber C has no access to the idling port, it has received no fuel-air mixture and hence no combustion has taken place when it passed the spark plug; thus it does not now contain any exhaust gases of which a portion could be transferred to the induction chamber as further rotation occurs.

Figure 2:
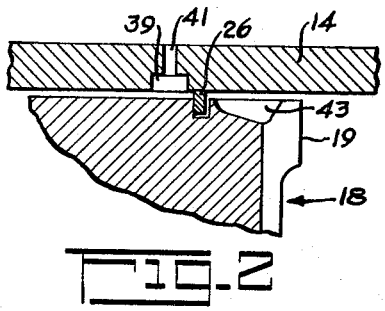
FIG. 2 is a fragmentary cross-section of the idling intake taken on line 2—2 of FIG. 1.

FIG. 2 shows a fragmentary cross-section of the end wall 14 and a portion of rotor 18, with the idling intake port 39 and the rotor recess 43 in the position shown in FIG. 1. With a few degrees more of rotation the rotor recess 43 will line up with idling port 39, and induction of the idling mixture will take place.

Figure 3:
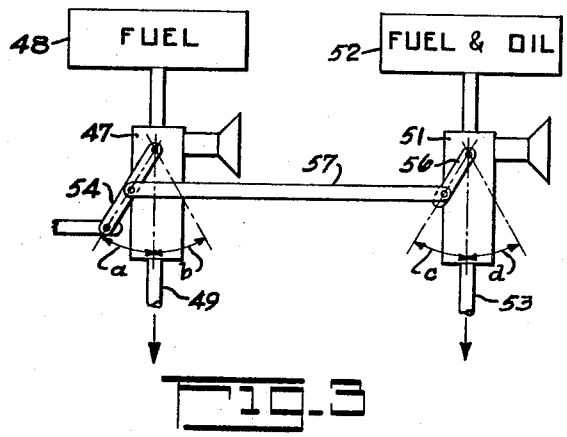
FIG. 3 is a schematic of a two-carburetor arrangement.

FIG. 3 shows schematically an arrangement of two carburetors for use in combination with the apparatus described above and shown in FIGS. 1 and 2. A main carburetor 47 is supplied with pure fuel from tank 48, and communicates with main intake port 27 through conduit 49. A second carburetor 51 is provided for idling and low load, supplied with a fuel-oil mixture from tank 52 and communicating with idling port 39 through conduit 53. Each of the two carburetors is provided with suitable actuating means, shown in the drawing as lever 54 on carburetor 47 and lever 56 on carburetor 51, the two actuating means being connected as by linkage 57.

The travel range of control lever 54 of carburetor 47 is indicated by arrows a and b, the throttle being wholly closed throughout the a portion of travel, and opening progressively through the b portion. The travel range of control lever 56 of idling carburetor 51 is shown by arrows c and d, the operative range being c, and d indicating a closed throttle position for the idling carburetor. Thus, as shown in FIG. 3 the main carburetor has a closed throttle and carburetor 51 is shown at the lowest idling level. As the two control levers and their associated linkage move toward the right (as shown), there is progressive opening of the throttle of the idling carburetor 51 for increased idling speed and low-load operation, throughout the range of travel c, while the main carburetor still remains closed through range a. When the center position is reached the main throttle of carburetor 47 begins to open and the idling and low-load throttle of carburetor 51 closes. The main throttle opening increases throughout range b while the idling throttle remains closed through range d. Thus the engine is lubricated by the fuel-oil mixture only during periods of idling and low load, which type of lubrication is satisfactory for intermittent and variable-load operation.

Figure 4:
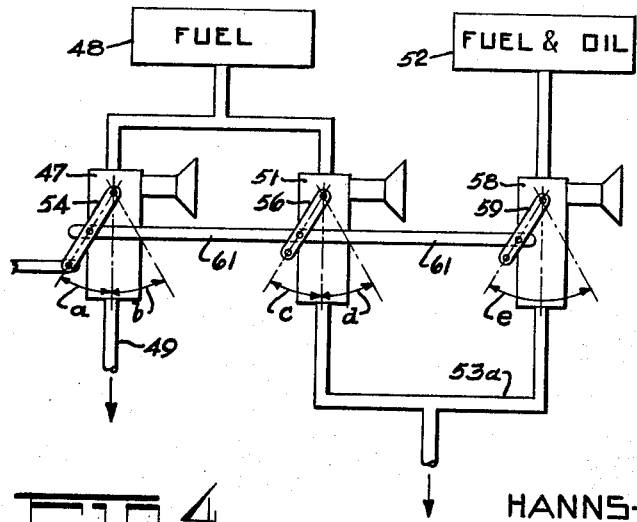
FIG. 4 is a schematic of a three-carburetor arrangement.

FIG. 4 shows a three-carburetor arrangement whereby the idling port is supplied by a separate carburetor, but lubrication is provided throughout the entire range of engine operation in quantity proportionate to engine load. The main carburetor 47 and the idling carburetor 51 operate in the manner previously described, except that in this case both are supplied from the main fuel tank 48 containing pure fuel. There is further provided a third carburetor 58 having control means 59, the control means of all three carburetors being connected as by linkage 61. Carburetors 51 and 58 both supply idling port 39 through the common conduit means 53a. The travel and operative ranges of control means 54 and 56 for the main and idling carburetors, respectively, are the same as before. Lubricating carburetor 58, however, has control means 59 which is operative throughout its entire travel range e, from lowest idle to full load. With this arrangement the engine receives fresh gas for idling and low load through idling port 39 from two carburetors, one of which supplies oil in addition to fuel. During medium and full load operation, the engine receives fresh gas through main intake port 27 and through idling port 39 from two carburetors, one of which again supplies oil in addition to fuel.

The three-carburetor arrangement has the advantage that exactly metered lubrication is obtained over the entire speed and load range of the engine without recourse to metering pumps, by controlling the proportions of the fuel-oil mixture in tank 52.

Although the invention has been described in the foregoing with reference to a specific embodiment, it will be understood that various changes and modifications may be made by those skilled in the art without departing from the concept of the invention. It is intended to cover all such modifications in the appended claims.

What is claimed is:

1. A rotary piston internal combustion engine, comprising in combination an outer body having axially spaced end walls and a multilobed peripheral wall therebetween having a basically epitrochoidal inner surface, a rotatable shaft transpiercing said end walls perpendicularly thereto and having an eccentric portion disposed within said outer body, a multi-apexed piston member rotatably mounted on said eccentric whereby on relative rotation of said piston and said outer body variable volume working chambers are formed, said piston having one more apex portion than said peripheral wall has lobes and having an end face adjacent to each of said end walls in sealing relation therewith and having a working face extending between each pair of adjacent apexes, a radially movable apex seal member borne by each of said apex portions sweeping said epitrochoidal surface in sealing relation therewith, said peripheral wall having a main induction port and an exhaust port, at least one of said end walls having an idling induction port of smaller cross-section than said main induction port and disposed in an area of said end wall that is continuously covered by said piston member, said piston member having a recess in at least one end face adjacent to said end wall having said idling port, said recess communicating with the adjacent working face and so disposed in said end face that it communicates with said idling port once in each piston revolution.

2. A rotary piston internal combustion engine as in claim 1, having in combination therewith a carburetor having main passage means and idling passage means, said main passage means communicating with said main induction port and said idling passage means communicating with said idling induction port.

3. A rotary piston internal combustion engine as in claim 1, having in combination therewith a first carburetor and a second carburetor, said first carburetor communicating with said main induction port, and said second carburetor communicating with said idling induction port.

4. A rotary piston internal combustion engine as in claim 3, wherein said first carburetor is supplied with pure fuel and said second carburetor is supplied with a mixture of fuel and oil.

5. A rotary piston internal combustion engine as in claim 4, wherein the control means of said first and second carburetors are linked together, the throttle of said second carburetor being closed when said first carburetor is operative, said second carburetor being operative when the throttle of said first carburetor is closed.

6. A rotary piston internal combustion engine as in claim 1 having in combination therewith a first carburetor, a second carburetor, and a third carburetor said first carburetor communicating with said main induction port, said second and third carburetors communicating with said idling induction port, said first and second carburetors being supplied with pure fuel and said third carburetor being supplied with a mixture of fuel and oil, the control means of all said carburetors being linked together, the throttle of said second carburetor being closed when said first carburetor is operative, said second carburetor being operative when the throttle of said first carburetor is closed, and said third carburetor being continuously operative.

References Cited by the Examiner
UNITED STATES PATENTS
3,168,077  2/1965  Froede _____ 123—8

MARK NEWMAN, *Primary Examiner.*